US009539739B2

(12) United States Patent
Ruthrauff

(10) Patent No.: US 9,539,739 B2
(45) Date of Patent: Jan. 10, 2017

(54) RECONFIGURABLE AND REUSABLE FLEXIBLE MEMBRANE MOLD FOR CASTING PANELS OF VARIABLE GEOMETRY

(71) Applicant: Hunter A. Ruthrauff, San Diego, CA (US)

(72) Inventor: Hunter A. Ruthrauff, San Diego, CA (US)

( * ) Notice: Subject to any disclaimer, the term of this patent is extended or adjusted under 35 U.S.C. 154(b) by 363 days.

(21) Appl. No.: 14/460,700

(22) Filed: Aug. 15, 2014

(65) Prior Publication Data

US 2016/0046038 A1 Feb. 18, 2016

(51) Int. Cl.

| | |
|---|---|
| ***B29C 33/30*** | (2006.01) |
| ***B29C 43/02*** | (2006.01) |
| ***B29C 43/06*** | (2006.01) |
| ***B28B 7/02*** | (2006.01) |

(52) U.S. Cl.

CPC .................................... *B28B 7/025* (2013.01)

(58) Field of Classification Search

CPC .. B28B 7/0091; B29C 43/361; B29C 33/0011; B29C 33/307; B29C 33/308; B29C 43/021; B29C 53/04

USPC ............................................ 425/89; 249/155

See application file for complete search history.

(56) References Cited

U.S. PATENT DOCUMENTS 4,212,188 A * 7/1980 Pinson ..................... B21D 5/01 72/413
5,151,277 A * 9/1992 Bernardon ............ B29C 33/302 249/155
5,796,620 A * 8/1998 Laskowski ............ B29C 33/302 700/118
5,846,464 A * 12/1998 Hoffman ................ B23Q 1/035 249/155
5,851,563 A * 12/1998 Hoffman ................... B28B 7/02 249/155
6,298,896 B1 * 10/2001 Sherrill ............... B29C 33/0011 249/155
8,057,206 B1 * 11/2011 McKnight ........... B29C 33/0011 249/161
9,427,898 B2 * 8/2016 Percival, Jr. .......... B29C 43/021
2012/0279812 A1 11/2012 Peters et al.
2013/0299084 A1 11/2013 Kristensen et al.

* cited by examiner

*Primary Examiner* — Joseph S. Del Sole
*Assistant Examiner* — Thukhanh T Nguyen
(74) *Attorney, Agent, or Firm* — Morland C. Fischer

(57) ABSTRACT

A reconfigurable and reusable flexible membrane mold by which architectural panels and the like can be cast into a variety of different sizes and shapes. The membrane mold includes a pair of mirrored sides that are arranged in spaced, opposing alignment so that a gap between the sides can be filled with casting material. Each side of the mold has a flexible forming membrane with a plurality of receiving cups extending therefrom. An array of actuating pins is coupled to each of the forming membranes by way of ball joints standing atop the actuating pins and ball joint connector heads within which the ball joints are received and retained. The ball joint connector heads are received by and embedded within the receiving cups. The flexible forming membranes are responsive to pushing and pulling forces applied thereto by the actuating pin in order to shape the forming membranes.

10 Claims, 8 Drawing Sheets

RECONFIGURABLE AND REUSABLE FLEXIBLE MEMBRANE MOLD FOR CASTING PANELS OF VARIABLE GEOMETRY

BACKGROUND OF THE INVENTION

1. Field of the Invention

This invention relates to an apparatus for solving manufacturing issues related to casting panels for use in the fields of industrial design and architecture. A reconfigurable and reusable flexible membrane mold is disclosed that can be selectively and accurately configured for casting panels and the like into a variety of different sizes and shapes.

2. Background Art

Software today has enabled designers to develop virtually any surface regardless of complexity and variability of curvature. Moreover, manufacturing has, for all intents and purposes, allowed the designer to realize these designs in physical artifact while presenting few limitations other than cost. We live in an age where population will exceed nine billion by 2050. Resources are becoming scarce and expensive, energy consumption is rising, and jobs are a welcome commodity globally. The building industry accounts for about half the world's consumption of energy which mandates that architects and engineers design sustainably. One of the most notable groups pushing for high performance sustainable design is the 2030 Challenge which asks the building industry to cut energy use in buildings by 50% by 2030. The program has since extended this challenge not only to the performance of buildings but the manufacturing and construction of buildings.

Computer Numeric Control (CNC) routing or hot wire foam cutting is the current industry standard for producing molds for casting objects that display smooth variable geometry. This method uses stock material that comes in sheet or block units and removes material until the final part is revealed in a process commonly known as subtractive manufacturing. This process typically utilizes a routing bit of various sizes and shapes or a hot wire to cut down the material. The resulting parts are precise, accurate, and relatively smooth. However, the process is both time consuming and wasteful with respect to material. A typical process for producing one panel would start with a three dimensional Computer Aided Drawing (CAD) surface that is exported into a Computer Aided Manufacturing (CAM) program. The CAM program will then write G-Code which is a series of movements and cut commands encoded as a computer language that the CNC tool understands as its series of steps to realize the final part. Once the G-Code is produced, it is uploaded to the post-processing program of the CNC machine. The machine will then complete a series of cutting steps during which it removes one layer of material at a time until a rough form emerges to produce the part. This rough part is then subjected to a finishing cut process that reveals the final part. As the machine cuts down the stock material, the excess is turned into dust, flakes, or smaller particles which are collected via vacuum and disposed of as waste. Upwards of 90% of a stock material can be cut away as waste to reveal the final part depending on the relief depth of the part. The process of producing the G-Code, loading up stock material, cutting down the material, and finishing the part is very time consuming and wasteful.

Another process for manufacturing panels is Pin-Point forming (PPF) which was invented in 1923 by C. J. Williams and T. Skinner. This process uses a two-dimensional former to produce manually-adjustable automobile leaf springs. About twenty years thereafter, this method of forming was expanded to three dimensions by adding multiple rows with the intent of forming sheet metal. These types of forming devices are referred to in the art as reconfigurable discrete dies. Such devices were not capable of being digitally actuated until the mid-1970's following work performed by Professor David Hardt at the Massachusetts Institute of Technology (MIT). Professor Hardt's original design was a press that configured itself by adjusting a matrix of densely packed quarter inch pins with rounded heads via servo actuators. The configuration of the pins is actuated into its final position via input from a CAD surface whose typography is broken down into a height-field of lines where length is translated into servo motor rotational degrees or stepper motor steps. These machines are referred to as digitally reconfigurable formers which allow molds to be produced in one step by turning CAD data into physical form. This technique requires no stock material and no CAM programming or G-Code production which advantageously creates no waste. Once the panel is produced, the pins reconfigure to their original rest state and the process can be repeated for any other configuration. Various types of pin point formers have been developed throughout the years aimed at pressing sheet metal or thermoforming panels directly onto the array of pins.

The disadvantage of these conventional formers and processes is that one cannot cast materials against an open array of pins, because the casting material will destroy the mechanism. Therefore, it would be desirable to be able to overcome this disadvantage by attaching a flexible impervious membrane onto the ends of these pins that allow one to cast objects of variable geometry and depth.

SUMMARY OF THE INVENTION

In general terms, a reconfigurable and reusable flexible membrane mold is disclosed which has particular use in the fields of industrial design and architecture to enable a variety of panels, tiles and other objects to be accurately cast. Each of a pair of opposing, mirrored sides of the membrane mold includes a flexible (e.g., rubber) forming membrane having a plurality of ball joint receiving cup extending therefrom. An arrayed grid of actuating pins is coupled to the flexible forming membrane of each mirrored side to apply pushing and/or pulling forces thereto to selectively change the geometry of the forming membrane depending upon the object to be cast. The actuating pins are attached to respective pin sleeves, each of which having a spherical ball joint standing upwardly therefrom. Each ball joint is received within a ball joint connector head so as to lie against and be capable of moving around a correspondingly shaped swivel cavity in response to a movement of an actuating pin to which the ball joint is connected. The ball joint connector heads are located inwardly of and embedded within respective ones of the ball joint receiving cups which extend from the flexible forming membrane.

As an important detail of this invention, the receiving cups are molded around and bonded to the connector heads to prevent the connector heads from pulling out of the receiving cups and becoming separated from the forming membrane. In this regard, each ball joint connector head has a ring-shaped armature located above the top thereof. A series of casting slots are formed through the armature. The casting slots communicate with casting channels that run along the outside of the connector head below the armature. During the process of molding the flexible forming membrane, molding material from the membrane flows into the casting slots and casting channels of each ball joint connector head. At the conclusion of the molding process, the molding material fills the casting slots and channels to create anchors for holding the ball joint connector heads in place within the ball joint receiving cups.

By virtue of the foregoing, the flexible forming membrane at each of the mirrored sides of the membrane mold will be continuously responsive to both back and forth, pushing and pulling, and rotational forces applied thereto by way of the arrayed grid of actuating pins. A pair of such forming membranes are arranged in spaced and opposing, face-to-face alignment to form a variety of shapes depending upon the direction of the forces being selectively applied to the arrayed grid of actuating pins by means of, for example, a stepper or servo-motor or by hand. A space between the opposing forming membranes is filled with casting material after which the forming membranes may be reused and reshaped.

DESCRIPTION OF THE PREFERRED EMBODIMENT

Figure 1:
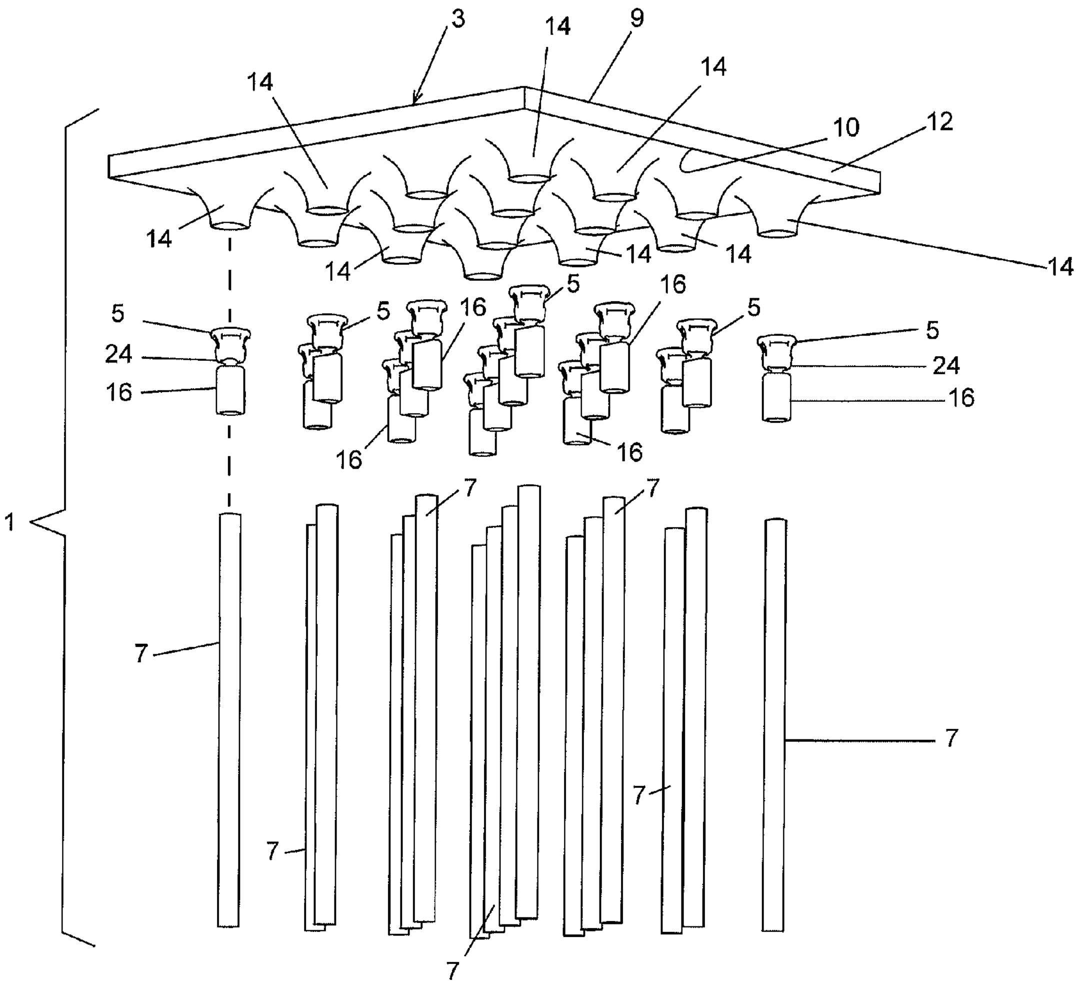
FIG. 1 is an exploded view showing one side of a reconfigurable and reusable membrane mold, according to a preferred embodiment, having a flexible forming membrane for casting architectural panels and other objects of different geometry.

Referring to the drawings, FIG. 1 shows an exploded view of one side 1 of a reconfigurable and reusable membrane mold for casting panels, tiles and other objects having a variety of geometries and construction materials. According to a preferred embodiment, the membrane mold side 1 includes an assembly of a flexible, impervious forming membrane 3, ball joint connector heads 5, and an arrayed grid of actuating pins 7. The aforementioned assembly is scalable to conform to an unlimited number of sizes and shapes. As will soon be described, the flexible forming membrane 3 is attached to the actuating pins 7 by means of the ball joint connector heads 5 to create a pinpoint forming apparatus for accurately shaping the flexible membrane into different 3-dimensional shapes.

The flexible forming membrane 3 of the one side 1 of the mold shown in FIG. 1 is preferably manufactured from a moldable (e.g., rubber) material and includes a front forming face 9, an opposing back face 10, and a perimeter 12 lying therebetween. By way of example, the flexible forming membrane 3 is manufactured by casting silicon rubber into a wax master mold. A plurality of sub-structural ball joint receiving cups 14 are molded into and extend from the back face 10 of membrane 3. The opposite front forming face 9 against which an object will be cast, as will be described in greater detail hereinafter when referring to FIGS. 4 and 5, can be smooth, grooved or textured to create an ornamental effect or facade. The ball joint receiving cups 14 form cavities in which to accommodate the ball joint connector heads 5 and stiffen the back face 10 of the flexible forming membrane 3 to prevent an undesired dimpling. The cups 14 which extend from the back face 10 of membrane 3 have a smooth curvature to support the space between the actuating pins 7 as the back face 10 of flexible forming membrane 3 is being shaped.

Hollow, cylindrical pin sleeves 16 are coupled to respective ball joint connector heads 5. The arrayed grid of actuating pins 7 is received inwardly of and mated (e.g., adhesively bonded) to the hollow pin sleeves 16. As will be described in greater detail when referring to FIGS. 2 and 3, each pin sleeve 16 carries an upwardly standing ball joint (designated 20 in FIG. 3) which is received inside a ball joint connector head 5 by way of an opening in the bottom of the head 5. As will be explained when referring to FIG. 5, each ball joint connector head 5 is adapted to swivel around a ball joint 20 as the flexible forming membrane 3 is shaped.

The perimeter 12 of the membrane 3 can be polygonal or spline-like having any number of edges depending upon the arrangement of the actuating pins 7. Additionally, the forming face 9 can be customized to integrate a variety of grooves, patterns, or relief designs. The plurality of ball joint receiving cups 14 are initially axially aligned with the arrayed grid of actuation pins 7 by way of the ball joint connector heads 5 and the pin sleeves 16 attached thereto. The thickness of the perimeter 12 between the front forming face 9 and the back face 10 of the forming membrane 3 is variable and dependent on the spacing of the grid of the actuating pins 7. As the pins 7 become less densely packed, the thickness of the perimeter 12 increases proportionately, and vice versa. The length and geometry of the ball joint receiving cups 7 are chosen to buckle or stiffen to accentuate deformity of the membrane 3.

As earlier explained, the ball joint receiving cups 14 which extend from the back face 10 of the flexible forming membrane 3 form cavities that are sized and shaped to accommodate the ball joint connector heads 5 therewithin. During manufacture of the membrane mold 1, the cups 14 of the forming membrane 3 are cast around and bonded to each of the connector heads 5. Thus, the ball joint connector heads 5 will be embedded within the ball joint receiving cups 14 so as to prevent a separation of heads 5 from cups 14 as the forming membrane 3 is shaped by the actuating pins 7.

Figure 2:
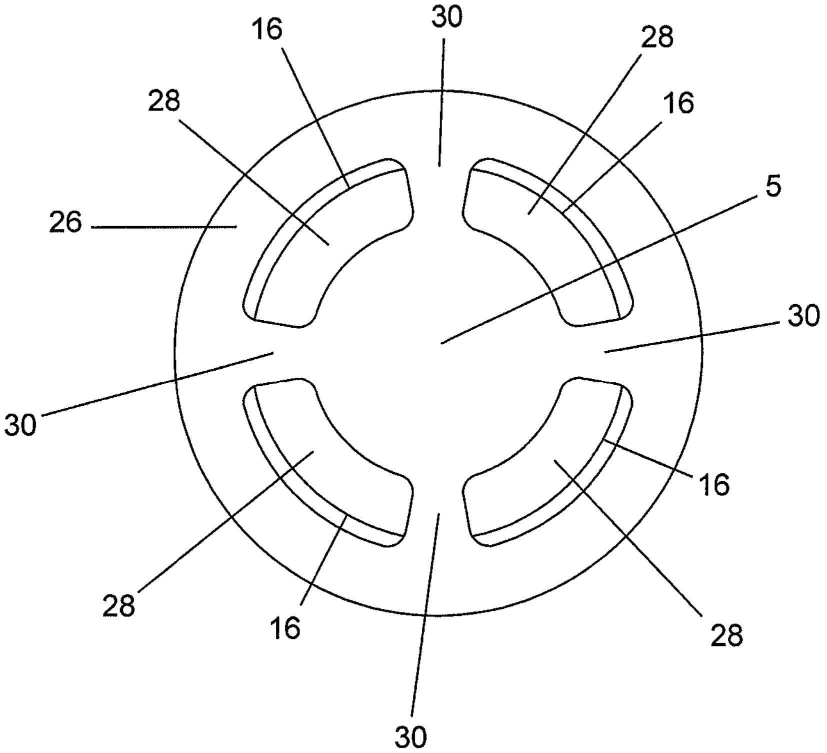
FIG. 2 is a top view of a ball joint connector head from the flexible membrane mold of FIG. 1 having material casting slots formed through a ring-shaped armature at the top thereof.
Figure 3:
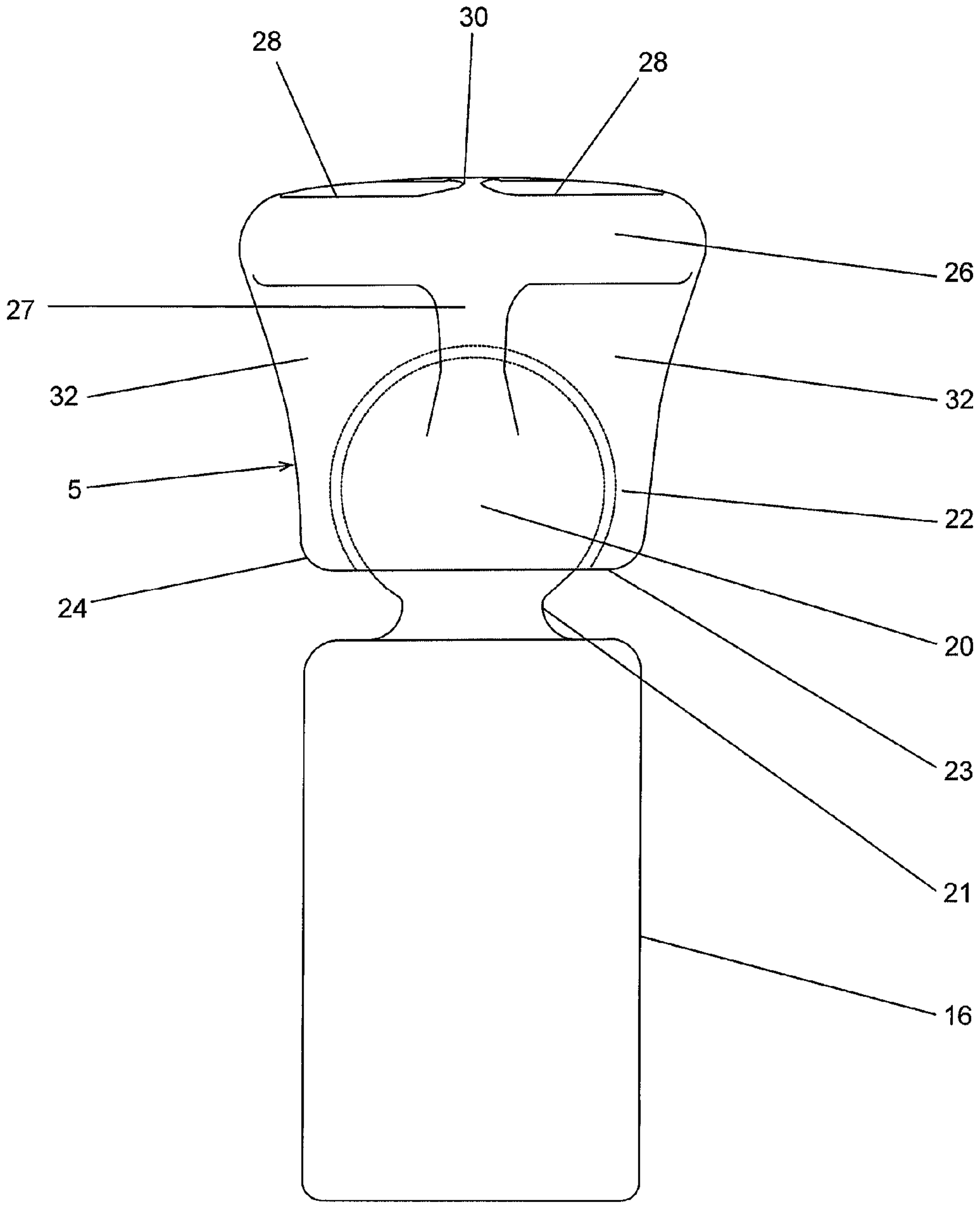
FIG. 3 is a side view of the ball joint connector head of FIG. 2 showing material casting slots and channels formed through the top and along the sides thereof.

FIGS. 2 and 3 of the drawings show a spherical ball joint 20, which stands upwardly from an actuating pin sleeve 16 by means of a narrow neck 21, being received against a correspondingly shaped swivel cavity 22 within a ball joint connector head 5. As is best shown in FIG. 3, the bottom of the connector head 5 contains an opening 23 that is surrounded by a retaining lip 24. The top of the ball joint 20 is located inside the connector head 5 so as to lie against the swivel cavity 22 thereof. The retaining lip 24 engages the bottom of the ball joint 20, whereby to prevent ball joint 20 from pulling out and separating from connector head 5. Accordingly, the ball joint connector head 5 is free to swivel in any direction around the ball joint 20 at the interface of the swivel cavity 22 of connector head 5 and ball joint 20.

As was previously explained while referring to FIG. 1, the forming membrane 3 of the membrane mold side 1 is cast around and bonded to each connector head 5. To this end, a generally ring-shaped armature 26 surrounds the top of the ball joint connector head 5. The armature 26 is held outwardly from the connector head by means of vertical supports 27. As is best shown in FIG. 2, a set of (e.g., four) casting slots 28 extend through the ring-shaped armature 26. The casting slots 28 are separated from one another by horizontal bridges 30 which run between the top of connector head 5 and the armature 26. The casting slots 28 through the ring-shaped armature 26 communicate with casting channels 32 (of FIG. 3) which run along the outside of the connector head 5 below armature 26.

In this regard, during the manufacture of the flexible membrane mold side (designated 1 in FIG. 1), the ball joints 20 which stand atop the sleeves 16 of the actuating pins 7 are located inside the ball joint connector heads 5 for receipt at the swivel cavities 22 so that the ball joint connector heads 5 can swivel around ball joints 20. After the ball joint connector heads 5 have been inserted inwardly of the ball joint receiving cups 14 of the flexible forming membrane, 3, the receiving cups 14 are molded around and bonded to the connector heads 5. In particular, during the molding process, the (e.g., rubber) molding material from the flexible forming membrane 3 runs through the casting slots 28 formed in the armature 26 of each connector head 5 and along the casting channels 32 at the sides of each connector head 5.

Figure 6:
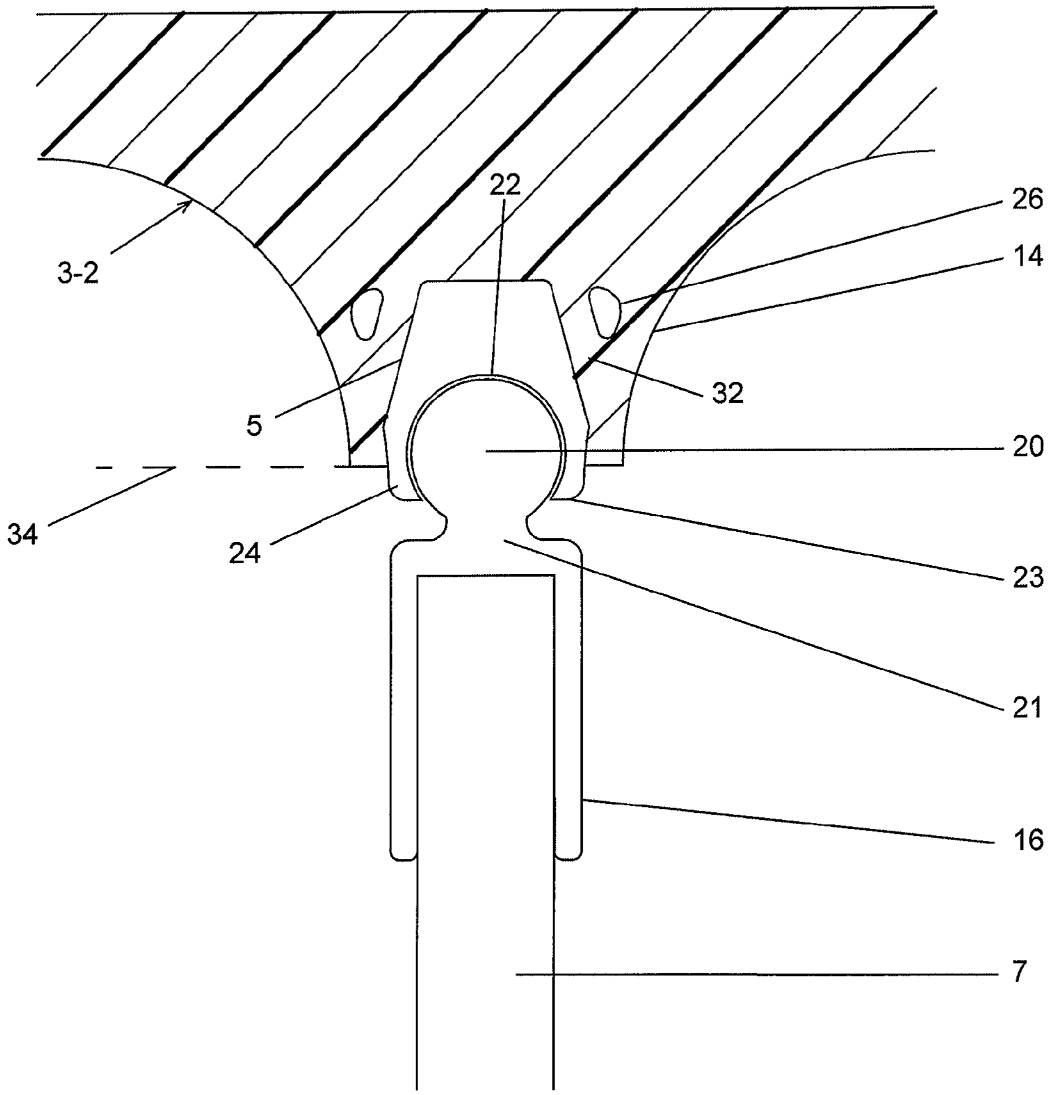
FIG. 6 is an enlarged detail taken from FIG. 4 to show one of the pair of flexible forming membranes of the membrane mold of FIG. 4 molded around and bonded to a ball joint connector head.

At the conclusion of the molding process, the casting slots 28 and the casting channels 32 will be filled with molding material to create a reliable anchor by which to hold the ball joint connector head 5 inside the respective ball joint receiving cups 14 of membrane 3. Hence, and as is best illustrated in FIG. 6, the molding boundary 34 of (e.g., rubber) molding material from the flexible forming membrane 3 extends close to bottom and just above the retaining lip 24 of each ball joint connector head 5, whereby the connector heads will be embedded within and retained by membrane 3. By virtue of the foregoing, the flexible forming membrane 3 will be continuously responsive to both back and forth, pushing and pulling forces applied thereto by the arrayed grid of actuating pins 7 to form a variety of architectural casting panels, tiles or the like having a corresponding variety of shapes.

Figure 4:
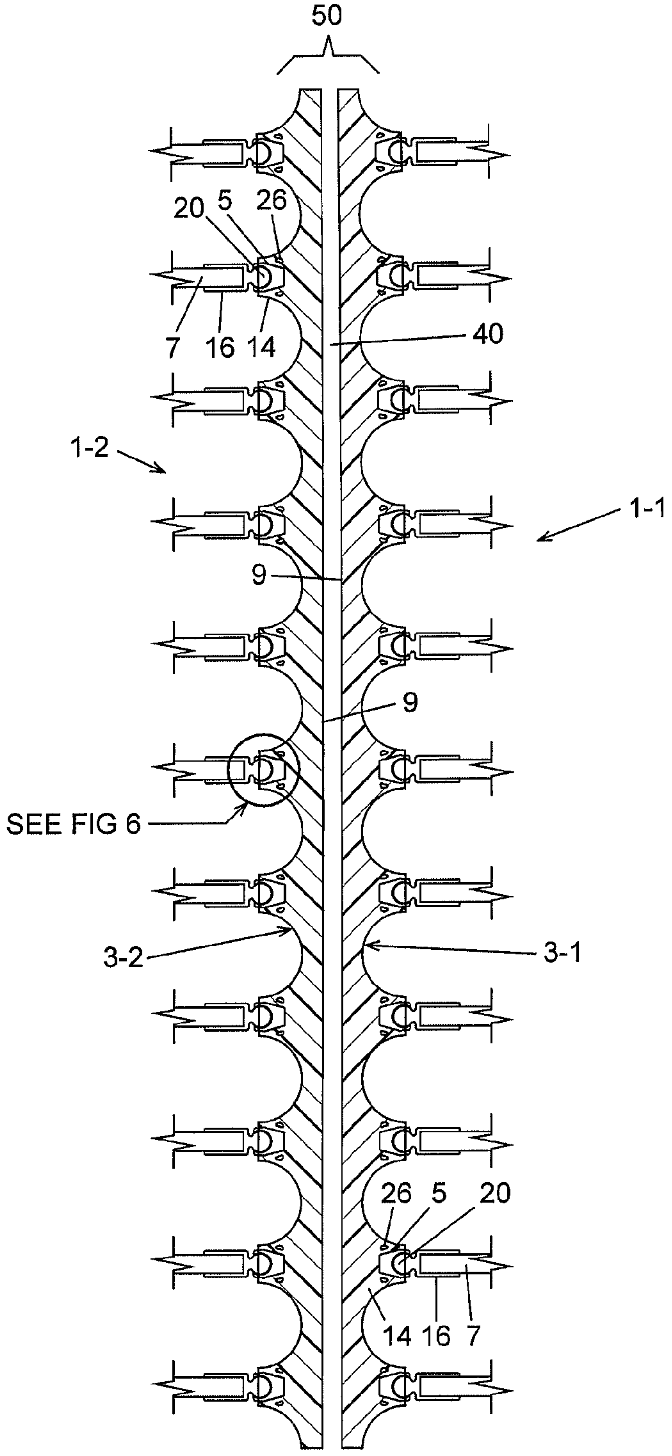
FIG. 4 shows opposing, mirrored sides of a flexible membrane mold having a pair of flexible forming membranes like that shown in FIG. 1 lying in spaced face-to-face alignment.

Turning now to FIG. 4 of the drawings, a pair of opposing, mirrored sides 1-1 and 1-2 of a reconfigurable and reusable membrane mold 50 are shown with the (e.g., textured) forming faces 9 of the respective flexible forming membranes 3-1 and 3-2 arranged face-to-face and separated from one another by a gap 40. The arrayed grids of actuating pins 7 that are coupled to membranes 3-1 and 3-2 by way of ball joint connector heads 5 and pin sleeves 16 are connected to conventional force-generating means (not shown) by which to apply pushing and/or pulling forces to the pins. By way of example only, such force-generating means may be a plurality of stepper or servo-motors clamped around the actuating pins 7. In the alternative, the actuating pins 7 may be manually driven by hand. The actuating pins 7 are initially arranged in parallel alignment with each other and in axial alignment with respective ball joint connector heads 5. The actuating pins 7 can be arrayed according to a CAD input which depends upon the object to ultimately be cast.

Figure 5:
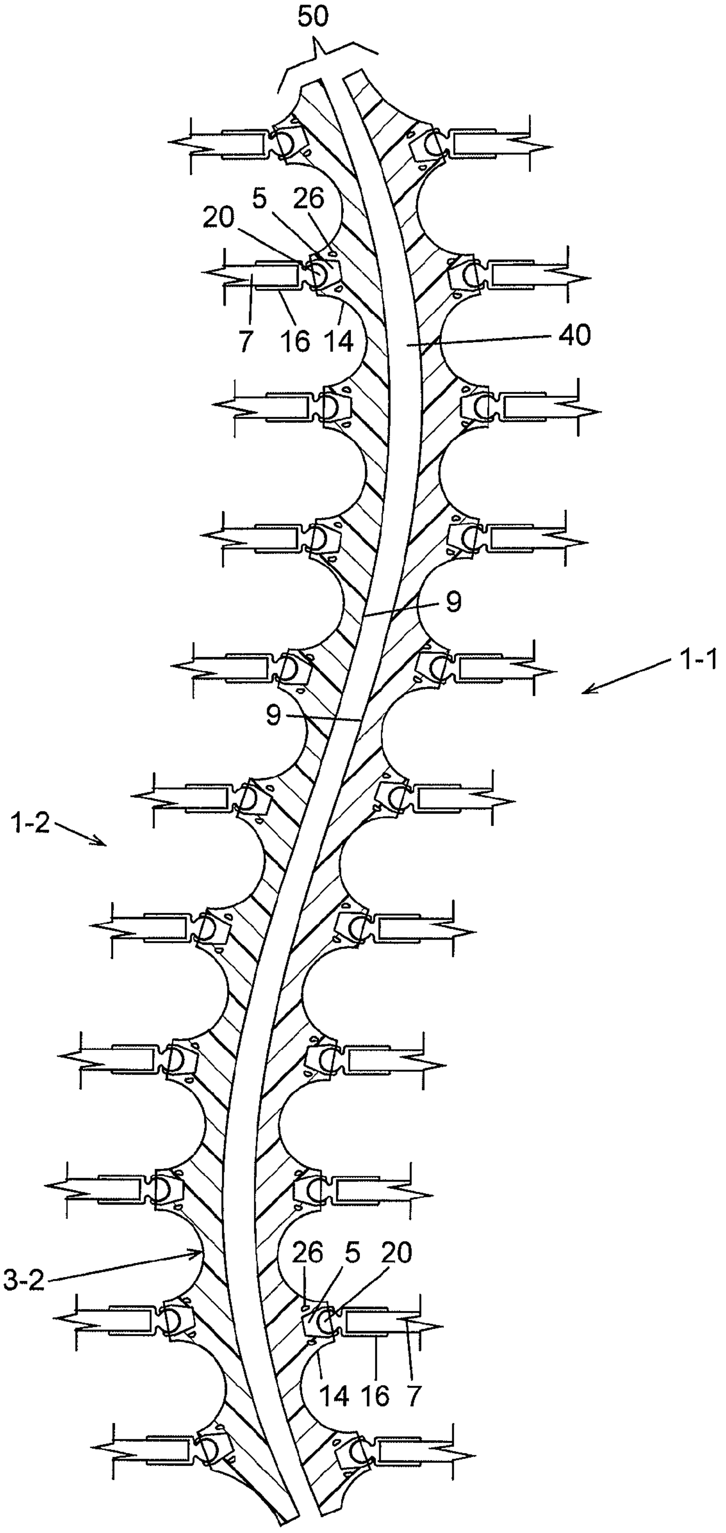
FIG. 5 shows the flexible membrane mold of FIG. 4 with the pair of flexible forming membranes thereof configured to form one of a variety of shapes so that an architectural panel or a similar object can be cast in a gap therebetween.

FIG. 5 of the drawings shows the flexible forming membranes 3-1 and 3-2 of the opposing mirrored sides 1-1 and 1-2 of the membrane mold 50 of FIG. 4 being manipulated depending upon the pushing and pulling forces applied to the grids of actuating pins 7. It may be appreciated that the positions of the actuating pins 7 relative to the forming membranes 3-1 and 3-2 are selectively and individually controlled so as to be able to form a variety of reconfigurable shapes in the gap 40 therebetween from which objects (e.g., architectural panels or tiles) of variable geometry and depth can be accurately cast. Once the shape is established, a suitable casting material (e.g., concrete or plastic resin) fills the gap 40 and is permitted to solidify.

As an advantage of the membrane mold 50 having the pair of mirrored sides 1-1 and 1-2 herein disclosed, at the conclusion of the casting process, pulling forces can be applied to the actuating pins 7 in order to separate the opposing flexible forming membranes 3-1 and 3-2 from one another so that the casting can be removed from the gap 40. The mirrored sides 1-1 and 1-2 of mold 50 may then be reused and reconfigured to form different shapes as needed in the architectural and industrial communities.

As was previously explained, the ball joint connector heads 5 that are embedded within the ball joint receiving cups 14 of the flexible forming membranes 3-1 and 3-2 are adapted to freely swivel around respective ball joints 20. More particularly, as the arrayed grids of actuating pins 7 apply back and forth, pushing and pulling forces along the membranes to impart a corresponding curvature thereto, the ball joint receiving cups 5 will swivel relative to pins 7. That is, while the back and forth moving actuating pins 7 remain parallel to each other during the shaping of the flexible forming membranes 3-1 and 3-2 at the mirrored sides 1-1 and 1-2 of the membrane mold 50, any number of the ball joint connector heads 5 can swivel out of their initial axial alignment with the actuating pins 7 depending upon the curvature imparted to the membranes. Thus, pinpoint shaping of the flexible forming membrane 3-1 and 3-2 can be achieved to produce smooth, high resolution topographical surfaces. What is more, the discrete pin pressures being applied by actuating pins 7 act to smooth out undesirable dimples and thereby permit a continuous curvature of the flexible forming membranes 3-1 and 3-2 in three dimensions.

FIG. 6 of the drawings is an enlarged detail taken from FIG. 4 to show the coupling of one of the arrayed grid of actuating pins 7 to the flexible forming membrane 3-2 of a respective one of the pair of mirrored sides 1-2 of the membrane mold 50. In particular, the ball joint 20 which stands atop a pin sleeve 16 is shown received by a swivel cavity 22 within a ball joint connector head 5 that is located inwardly of and embedded within a ball joint receiving cup 14 extending from the forming membrane 3-2 to prevent a detachment of the connector head 5 from the forming membrane 3-2 as the membrane is shaped.

Figure 7:
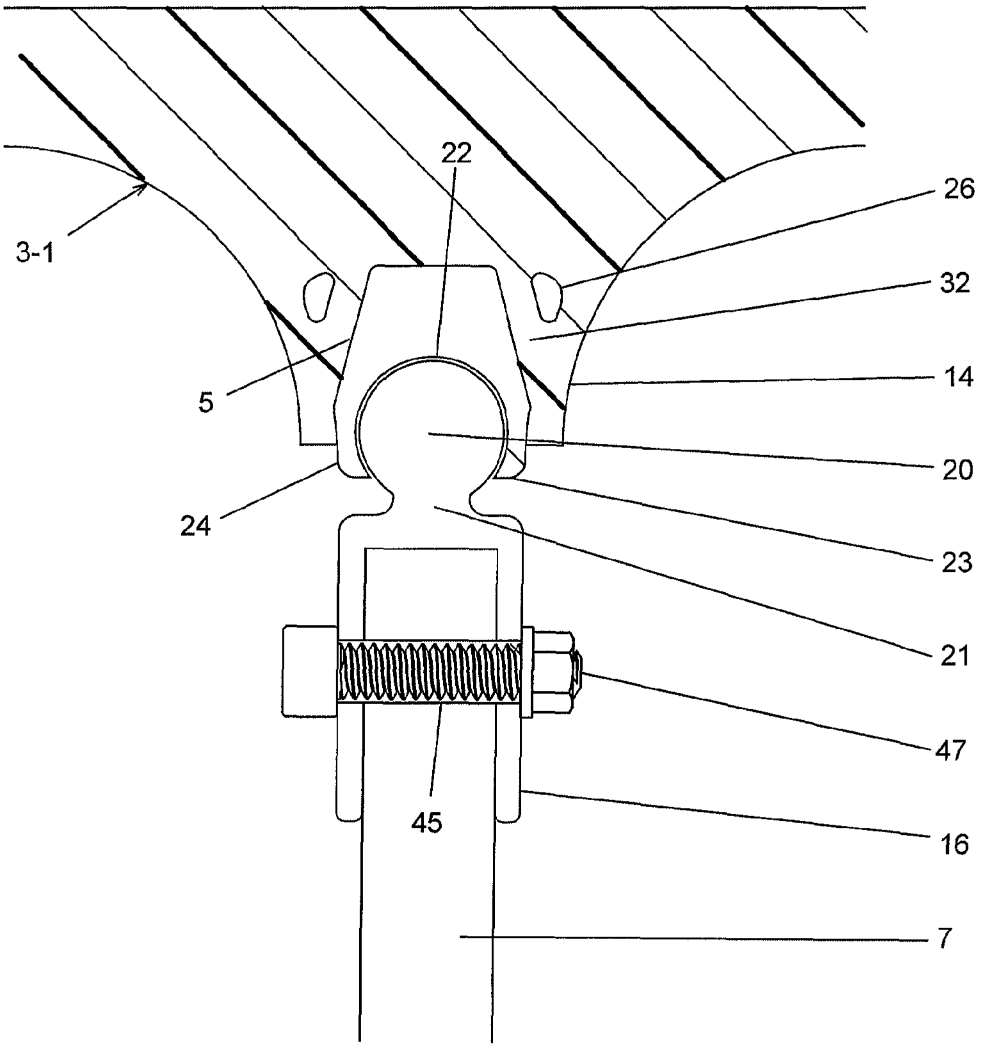
FIG. 7 shows a fastener for connecting one of the array of actuating pins to a pin sleeve having a ball joint standing upwardly therefrom for receipt by a ball joint connector head of one of the flexible forming membranes of the membrane mold of FIG. 4.

FIG. 7 of the drawings shows an optional threaded fastener (e.g., a bolt or machine screw) 45 extending laterally through one of the arrayed grid of actuating pins 7 and the hollow pin sleeve 16 within which the actuating pin 7 is received and mated. A threaded nut 47 is attached to one end of the threaded fastener 45 to hold the fastener in place. The combination threaded fastener and nut 45 and 47 may be used in addition to or in substitution of the adhesive bonding described above for mating the pin 7 to its sleeve 16.

Figure 8:
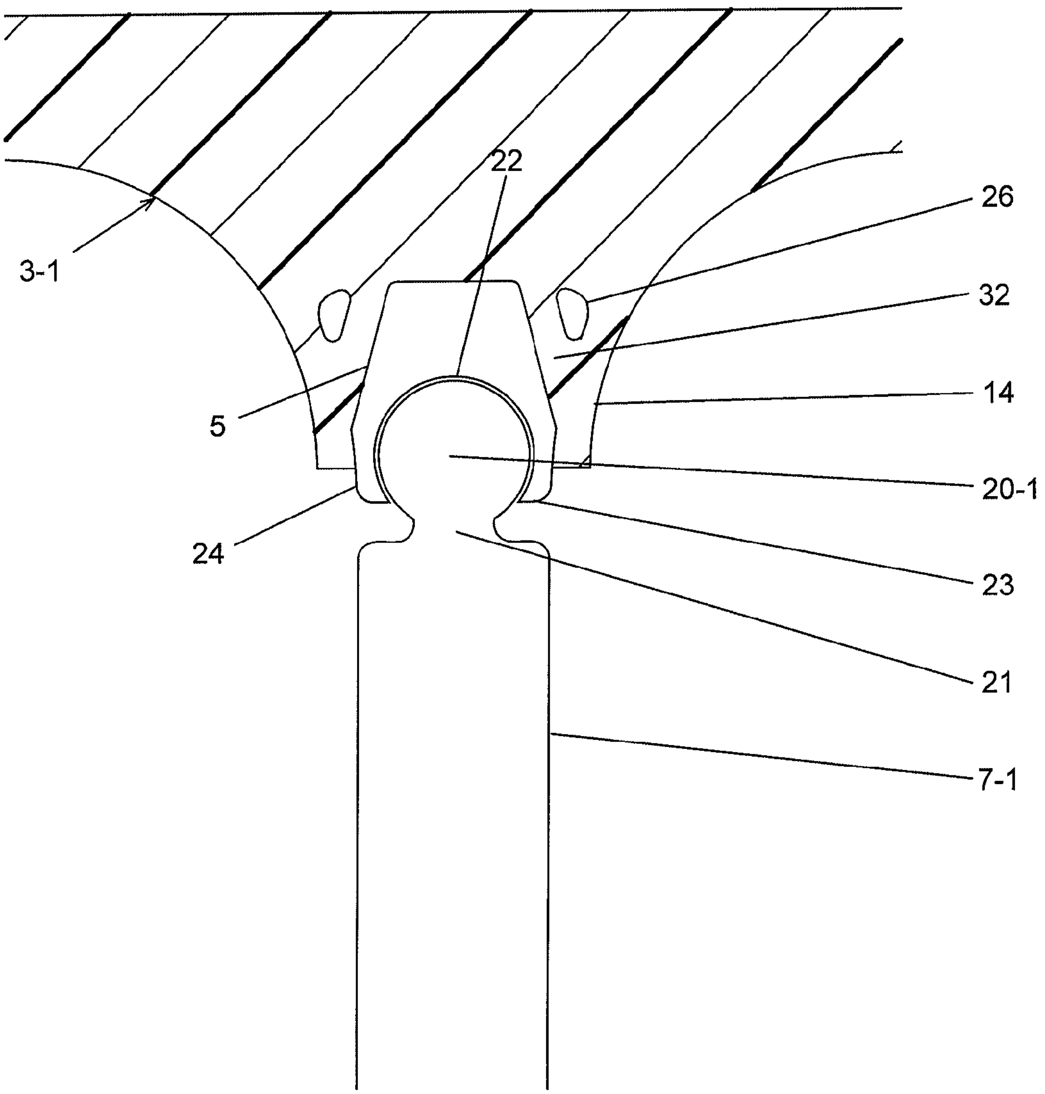
FIG. 8 shows an alternate embodiment by which a different one of the array of actuating pins is coupled to one of the flexible forming membranes of the membrane mold of FIG. 4.

FIG. 8 of the drawings shows a modification to the membrane mold 50 described while referring to FIG. 4. As was earlier described, each one of an arrayed grid of actuator pins 7 is mated to a respective hollow pin sleeve 16, and the pin sleeve 16 is coupled to a flexible forming membrane (e.g., 3-1) at one side 1-1 of mold 50 by means of the receipt of a ball joint connector head 5 by a ball joint receiving cup 14 from membrane 3-1. In the modification of FIG. 8, the pin sleeve 16 is eliminated, and a ball joint 20-1 is connected directly to and stands upwardly from an actuating pin 7-1 (rather than from the former pin sleeve 16). As in the case of FIG. 4, the ball joint 20-1 is received inwardly of a ball joint connector head 5 so as to lie against a swivel cavity 22 of the connector head 5.

The invention claimed is:

1. A reconfigurable membrane mold from which variable geometry objects are cast, said membrane mold including:

a flexible forming membrane having a plurality of coupler receiving cavities;

a corresponding plurality of coupler connector heads received by and retained within respective ones of said plurality of coupler receiving cavities;

an array of actuating pins to receive and apply pushing and pulling forces to said flexible forming membrane to change the shape of said forming membrane depending upon the direction of the pushing and pulling forces being applied to said array of actuating pins; and a plurality of couplers connected to respective ones of said plurality of coupler connector heads, each of said plurality of couplers also being attached to a corresponding one of said array of actuating pins, such that the pushing and pulling forces applied to said array of actuating pins are transferred to said flexible forming membrane by way of said plurality of couplers and the plurality of coupler connector heads to which said plurality of couplers are respectively connected.

2. The reconfigurable membrane mold recited in claim 1, wherein there is a sleeve surrounding each of said array of actuating pins, said plurality of couplers being attached to respective ones of said actuating pins at said sleeves thereof.

3. The reconfigurable membrane mold recited in claim 2, wherein there is a fastener extending through each of said array of actuating pins and the sleeve surrounding said actuating pin so as to attach said sleeve to said actuating pin.

4. The reconfigurable membrane mold recited in claim 1, wherein each of said plurality of couplers is a ball joint.

5. The reconfigurable membrane mold recited in claim 4, wherein each of said plurality of coupler connector heads has a swivel cavity at which to receive a respective one of said plurality of ball joints, such that said plurality of coupler heads can swivel in any direction around respective ones of said plurality of ball joints depending upon the direction of the pushing and pulling forces being applied by said array of actuating pins to said flexible forming membrane to change the shape thereof.

6. The reconfigurable membrane mold recited in claim 5, wherein said plurality of coupler connector heads are responsive to pushing, pulling and swivel forces to correspondingly change the shape of said flexible forming membrane depending upon the direction of the pushing and pulling forces being applied by said array of actuating pins to said flexible forming membrane.

7. The reconfigurable membrane mold recited in claim 5, wherein each of said plurality of coupler connector heads has an opening formed therein lying opposite said swivel cavity and a lip surrounding said opening to engage and retain said plurality of ball joints within said swivel cavities, said ball joints attached to corresponding ones of said array of actuating pins by way of said openings in said plurality of coupler connector heads.

8. The reconfigurable membrane mold recited in claim 1, wherein said flexible forming membrane is manufactured from a moldable material, each of said plurality of coupler connector heads to which respective ones of said plurality of couplers are connected has a flow channel running along a side thereof in which to receive the moldable material from said forming membrane, whereby said plurality of coupler connector heads are embedded within respective ones of said plurality of coupler receiving cavities of said forming membrane.

9. The reconfigurable membrane mold recited in claim 8, wherein each of said plurality of coupler connector heads also has an armature ring extending therearound and having at least one slot formed therein which communicates with said flow channel, the moldable material from said forming membrane being received through the slot of said armature ring and within said flow channel by which said plurality of connector heads are surrounded with the moldable material and thereby anchored within said plurality of coupler receiving cavities of said forming membrane.

10. A reconfigurable membrane mold from which variable geometry objects are cast, said membrane mold having a pair of sides lying opposite one another and separated by a gap in which to receive a casting material, each side of said membrane mold including:

a flexible forming membrane having a plurality of ball joint receiving cavities;

a corresponding plurality of ball joint connector heads received by and retained within respective ones of said plurality of ball joint receiving cavities;

an array of actuating pins to receive and apply pushing and pulling forces to said flexible forming membrane to change the shape of said forming membrane depending upon the direction of the pushing and pulling forces being applied to said array of actuating pins; and a plurality of ball joints connected to respective ones of said plurality of ball joint connector heads, each of said plurality of ball joints also being attached to a corresponding one of said array of actuating pins, such that the pushing and pulling being applied to said array of actuating pins are transferred to said flexible forming membrane by way of said plurality of ball joints and the plurality of ball joint connector heads to which said plurality of ball joints are respectively connected.

* * * * *